US012408245B2

(12) United States Patent
Wen

(10) Patent No.: US 12,408,245 B2
(45) Date of Patent: Sep. 2, 2025

(54) METHOD FOR REALIZING MULTIPLE DIMMING CONTROL MODE OF LED POWER SUPPLY

(71) Applicant: Zhuhai Shengchang Electronics Co., Ltd., Zhuhai (CN)

(72) Inventor: Guobiao Wen, Meizhou (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 61 days.

(21) Appl. No.: 18/522,020

(22) Filed: Nov. 28, 2023

(65) Prior Publication Data

US 2025/0056689 A1 Feb. 13, 2025

(30) Foreign Application Priority Data

Aug. 8, 2023 (CN) ........................ 202310990956.X

(51) Int. Cl.
*H05B 45/10* (2020.01)
*H05B 45/325* (2020.01)

(52) U.S. Cl.
CPC ........... *H05B 45/10* (2020.01); *H05B 45/325* (2020.01)

(58) Field of Classification Search
CPC ...... H05B 45/10; H05B 45/325; H05B 45/30; H05B 45/37
See application file for complete search history.

(56) References Cited

U.S. PATENT DOCUMENTS

| | | | | |
|---|---|---|---|---|
| 9,961,724 B1 * | 5/2018 | Zheng | .................... | H05B 45/31 |
| 11,694,601 B2 * | 7/2023 | Hussell | .................... | G09G 3/32 257/99 |
| 2012/0062133 A1 * | 3/2012 | Cubias | ................. | H05B 47/175 315/201 |
| 2021/0392729 A1 * | 12/2021 | Zheng | .................... | H05B 45/10 |

* cited by examiner

*Primary Examiner* — Minh Tran
(74) *Attorney, Agent, or Firm* — Wang Law Firm, Inc.

(57) ABSTRACT

The present invention provides a method for realizing a multiple dimming control mode of an LED power supply, which enables users to switch the dimming control method of the power supply to a DC voltage dimming, a PWM dimming, a PWM combined with PWM frequency conversion dimming, etc. according to a load of the lamp condition. The LED dimming power supply using this method combines the advantages of the above dimming control methods, significantly improves the compatibility with existing various types of lamps, and enables users to select a more appropriate dimming control method according to the load of the lamp of a practical application and its dimming characteristic, so as to achieve the optimal usage status and dimming effect of the lamp.

4 Claims, 2 Drawing Sheets

METHOD FOR REALIZING MULTIPLE DIMMING CONTROL MODE OF LED POWER SUPPLY

FIELD OF INVENTION

The present invention is related to the technical field of a lamp dimming control device, and more particularly related to a method for realizing a multiple dimming control mode of an LED power supply.

BACKGROUND OF THE INVENTION

In the field of the dimming power supply of an LED, the mainstream dimming control method primarily includes a DC voltage dimming control method, a pulse width modulation (PWM) dimming control method, etc. The PWM dimming control method, as a mature dimming technology, combined with a digital control technology can offer a very high dimming control accuracy and will not produce a chromatic shift when dimming. As to the PWM dimming control method, the frequency of the PWM is a main factor that determines the lighting effect. If the PWM pulse frequency is too low, there will be a flicker phenomenon causing fatigue to human eyes when staying in such environment, and there will be dimming noises produced when dimming. If the frequency is high, the lighting brightness cannot be adjusted to a very low level while ensuring the good conditions of the dimming effect. As to the DC voltage dimming control method, it can be combined with other digital control technologies to achieve a very high dimming control accuracy, or even a better and smoother effect of dimming. However, the shortcomings of this method are also obvious. For some lamps or strip lights with a high voltage drop including all lamps on the market, they can only be adjusted by the PWM dimming control method to adjust the brightness and color temperature, thus the DC voltage dimming control method will not be able to achieve a satisfactory dimming effect.

In view of the aforementioned deficiencies of the prior art, it is necessary to provide a method that enables users to freely switch the power supply dimming control method according to the load of the lamp.

SUMMARY OF THE INVENTION

In order to overcome the deficiencies of the prior art, it is a primary objective of the present invention to provide a method of realizing a multiple dimming control mode of an LED power supply, and the method enables users to freely switch the dimming power supply to a dimming control method for DC voltage dimming, PWM dimming, PWM combined with PWM frequency conversion dimming, etc.

To achieve the above objective, the present invention provides the following solution:

A method for realizing a multiple dimming control mode of an LED power supply is applied to the LED power supply, and the LED power supply includes: a power supply main drive module, a power MOS tube, a DC dimming control module, a dimming signal collection module, a main control module and a mode switching module. The power supply main drive module is connected to a lamp, the DC dimming control module, and the dimming signal collection module. The power MOS tube is installed on a connecting path of the power supply main drive module and the lamp. The main control module is connected to the power MOS tube, the DC dimming control module, the dimming signal collection module and the mode switching module. The method of the invention includes the following steps:

The main control module is used to detect a status signal of the mode switching module and determine a current dimming control method according to the status signal.

When the dimming control method takes a DC dimming control mode, a dimming signal of the dimming signal collection module will be transmitted to the main control module, a corresponding dimming control signal based on the main control module will be generated according to the dimming signal and sent to the DC dimming control module, and an output voltage of the power supply main drive module based on the DC dimming control module will be controlled according to the dimming control signal to change a lamp brightness.

When the dimming control method takes a PWM dimming control mode, the main control module will be used to output a maximum voltage control signal to the DC dimming control module, so that the power supply main drive module will output a maximum voltage, and the main control module will be used to sample and analyze the signal size of the dimming signal collection module, and a corresponding PWM drive signal will be outputted to the power MOS tube to change the lamp brightness.

If the dimming control method takes a PWM combined with PWM frequency conversion dimming control mode, the main control module is used to output a maximum voltage control signal to the DC dimming control module, so that the power supply main drive module outputs a maximum voltage, and the main control module is used to sample and analyze the signal size of the dimming signal collection module and output a corresponding PWM combined with PWM frequency conversion drive signal to the power MOS tube to change the lamp brightness.

Preferably, when the dimming control method takes the PWM combined with PWM frequency conversion dimming control mode, the main control module outputs the PWM combined with WM frequency conversion drive signal, and whenever such signal is changed with one level each time, the frequency of the PWM signal will be synchronously changed with one level.

Preferably, when the dimming control method takes the PWM combined with PWM frequency conversion dimming control mode, and the PWM value is changed to N % PWM during the changing process from 100% PWM to 0% PWM, the PWM frequency remains unchanged; when the PWM value is changed from N % PWM to 10% PWM, the PWM value and the PWM frequency are synchronously changed; when the PWM value reaches 10% PWM, the PWM frequency reaches a minimum setting frequency; and when the PWM value is changed from 10% PWM to 0% PWM, the PWM frequency keeps the minimum setting frequency unchanged; wherein N is the default PWM threshold, and N≥10%.

Preferably, when the dimming control method takes the PWM combined with PWM frequency conversion dimming control mode, and the PWM value is changed during the changing process from 100% PWM to 0% PWM, the change of the PWM frequency can be set to any point according to the dimming effect.

According to the specific embodiments of the present invention, the present invention has disclosed the following technical effects:

The present invention provides a method that enables users to switch the dimming control method of a power supply according to the load of the lamp. The implementation of this method can freely switch the dimming control method of the dimming power supply to DC voltage dimming, PWM dimming, PWM combined with PWM frequency conversion dimming, etc. The LED dimming power supply using this method combines the advantages of the above dimming control methods, significantly improves the compatibility with existing various types of lamps, and enables users to select a more appropriate dimming control method according to the load of the lamp in a practical application and its dimming characteristic, so as to achieve the optimal usage status and dimming effect of the lamp.

BRIEF DESCRIPTION OF THE DRAWINGS

In order to more clearly illustrate the embodiments of the present invention or the technical solutions of the prior art, the following drawings illustrating the implementation of the embodiments are used for brief introduction. It is obvious that the following description of the drawings are only some of the embodiments of the present invention. As to the persons having ordinary skill in the art, other drawings can also be obtained from the following drawings without creative effort or labor.

DETAILED DESCRIPTION OF THE PREFERRED EMBODIMENTS

The technical solutions in the embodiments of the present invention will be clearly and comprehensively described in conjunction with the accompanying drawings in the embodiments of the present invention as follows. Obviously, the described embodiments are only part of the embodiments, but not all embodiments of the present invention. Based on the embodiments of the invention, all other embodiments obtained by those having ordinary skill in the art without creative efforts shall also fall within the scope of protection of the invention.

The term "embodiment" mentioned in this specification herein means that a particular feature, structure, or characteristic described together with an embodiment may be included in at least one embodiment of the present application. The presence of the term "embodiment" at various parts of the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

The terms "first", "second", "third", "fourth", etc. in the specification, claims and accompanying drawings of the present application are used to distinguish between different objects and are not intended to describe a particular order. In addition, the terms "comprises" and "has", and any of their variations are intended to cover non-exclusive inclusion. For example, the inclusion of a series of steps, processes, methods, devices, etc. is not limited to the listed steps, processes, methods, devices, etc., but optionally includes the steps, processes, methods, devices etc. that are not listed, or optionally includes other steps, processes, methods, devices etc. that are inherent to those listed.

It is an objective of the present invention to provide a

The objective, characteristics and advantages of the present invention will become apparent in the following detailed description of the preferred embodiments with reference to the accompanying drawings.

Figure 1:
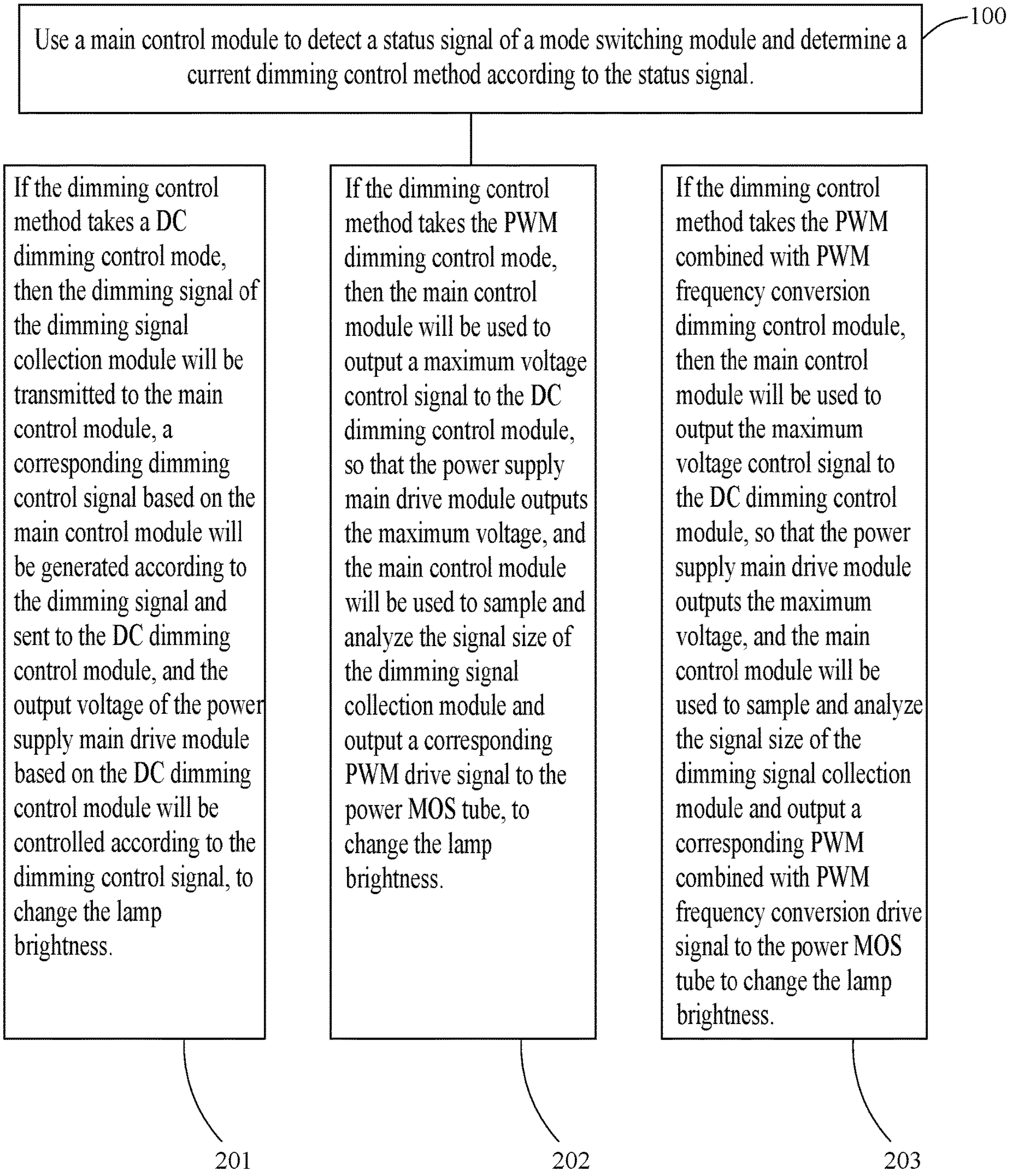
FIG. 1 is a schematic block diagram showing the principle of an embodiment of the present invention.

With reference to FIG. 1 for the schematic block diagram showing the principle of an embodiment of the present invention, the present invention provides an LED power supply including: a power supply main drive module, a power MOS tube, a DC dimming control module, a dimming signal collection module, a main control module and a mode switching module. The power supply main drive module is connected to a lamp, the DC dimming control module, and the dimming signal collection module. The power MOS tube is installed on the connecting path of the power supply main drive module and the lamp. The main control module is connected to the power MOS tube, the DC dimming control module, the dimming signal collection module and the mode switching module. Wherein, a live wire L and a neutral wire N of utility power are connected to the power supply main drive module.

Specifically, the power supply main drive module has a terminal connected the L and N inputs of the utility power and another terminal connected to the DC dimming control module, a positive electrode (+) of the dimming signal collection module, a source electrode(S) of the power MOS tube. The main control module is connected to the DC dimming control module, the dimming signal collection module, the mode switching module, a gate electrode (G) of the power MOS tube. The drain electrode (D) of the power MOS tube D is connected to a negative electrode (−) of the lamp.

Figure 2:
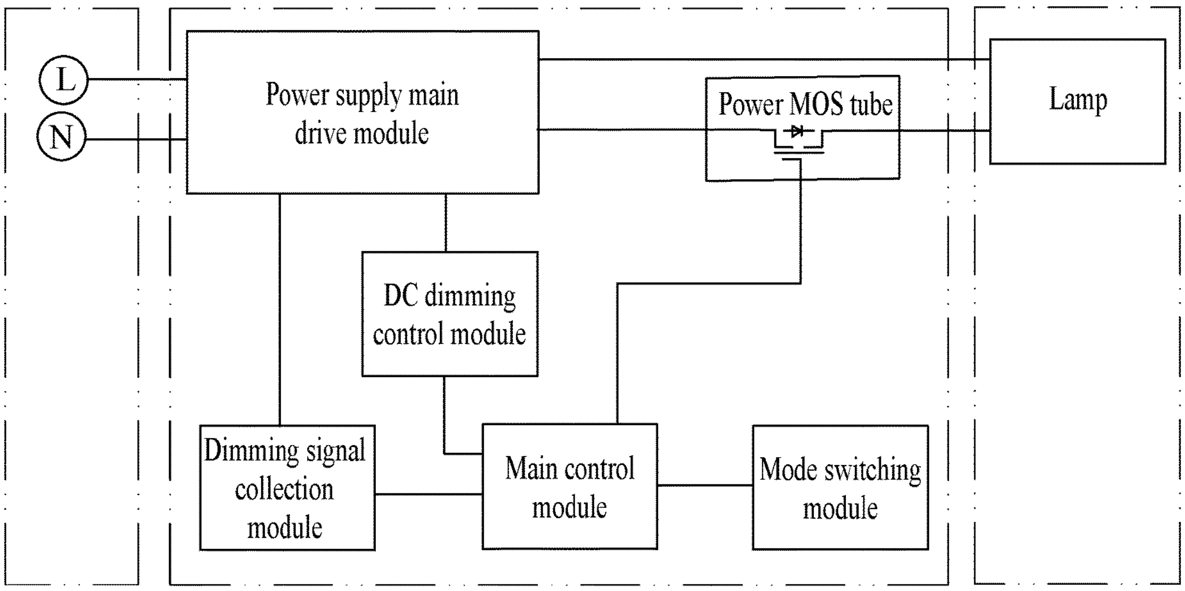
FIG. 2 is flow chart of a method in accordance with an embodiment of the present invention.

With reference to FIG. 2 for the flow chart of the method in accordance with the present invention, this embodiment further provides a method for realizing a multiple dimming control mode of an LED power supply applied to the aforementioned LED power supply, and the method includes the following steps S100, S201, S202 and S203:

S100: The main control module is used to detect a status signal of the mode switching module and determine a current dimming control method according to the status signal.

S201: If the dimming control method takes the DC dimming control mode, then the dimming signal of the dimming signal collection module will be transmitted to the main control module, a corresponding dimming control signal based on the main control module will be generated according to the dimming signal and sent to the DC dimming control module, and the output voltage of the power supply main drive module based on the DC dimming control module will be controlled according to the dimming control signal, to change a lamp brightness S202: If the dimming control method takes the PWM dimming control mode, then the main control module will be used to output a maximum voltage control signal to the DC dimming control module, so that the power supply main drive module outputs the maximum voltage, and the main control module will be used to sample and analyze the signal size of the dimming signal collection module and output a corresponding PWM drive signal to the power MOS tube, to change the lamp brightness.

S203: If the dimming control method takes the PWM combined with PWM frequency conversion dimming control module, then the main control module will be used to output the maximum voltage control signal to the DC dimming control module, so that the power supply main drive module outputs the maximum voltage, and the main control module will be used to sample and analyze the signal size of the dimming signal collection module and output a corresponding PWM combined with PWM frequency conversion drive signal to the power MOS tube to change the lamp brightness.

Specifically, the operation flow of this embodiment is as follows:

The power supply main drive module is connected to the L and N wires of the utility power, and the main control module operates to receive and detect a signal status of the mode switching module. After the main control module has analyzed and determined the signal for several times and then has determined the current dimming control method, the power supply will enter into the corresponding operating mode.

When the main control module determines the signal status which indicates that the mode switching module selects the DC dimming control mode, the power supply will enter into the DC dimming control mode. The main control module outputs the 100% PWM drive signal to completely and electrically conduct the power MOS tube, and the voltage driven and outputted by the power supply is controlled by the main control module to detect the signal size of the current dimming signal collection module, and then to link the DC dimming control module. In other words, the dimming the lamp brightness can be changed by the dimming signal collection module which transmits the dimming signal to the main control module, the main control module which transmits the corresponding dimming control signal to the DC dimming control module, and the DC dimming control module which links and controls the power supply to drive and change the output voltage.

When the main control module determines that the signal status of the mode switching module is in the PWM dimming control mode, the power supply will enter into the PWM dimming control mode. The main control module outputs a maximum voltage control signal to the DC dimming control module, so that the power supply drives and outputs the maximum voltage. At this time, the dimming the lamp brightness is achieved by the main control module which links and controls the power MOS tube. In other words, the main control module samples and analyzes the signal size of the dimming signal collection module and then outputs a corresponding PWM drive signal to the power MOS tube, so that the lamp brightness can be changed from 0% to 100%.

When the main control module determines that the signal status of the mode switching module is in the PWM combined with PWM frequency conversion dimming control mode, the power supply will enter into the PWM combined with PWM frequency conversion dimming control module. The main control module outputs the maximum voltage control signal to the DC dimming control module, so that the power supply drives and outputs the maximum voltage. At this time, the effect of dimming the lamp brightness can be achieved by the main control module which links and controls the power MOS tube. In other words, the main control module samples and analyzes the signal size of the dimming signal collection module and then outputs the corresponding PWM combined with PWM frequency conversion drive signal to the power MOS tube, so that the lamp brightness can be changed within a range from 0% to 100%.

Preferably, when the power supply operates in the PWM combined with PWM frequency conversion dimming control module, the main control module outputs a PWM signal. Whenever such PWM signal is changed with one level each time, the frequency of the PWM signal is synchronously changed with one level.

Further, when the power supply operates in the PWM combined with PWM frequency conversion dimming control module, and during the changing process of the PWM value from 100% PWM to 0% PWM, and the PWM value is changed to N % PWM, the PWM frequency remains unchanged, and when the PWM value is changed from N % PWM to 10% PWM, the PWM value and the PWM are synchronously changed, and when the PWM value reaches 10% PWM, the PWM frequency reaches the minimum setting frequency, and when the PWM value is changed from 10% PWM to 0% PWM, the PWM frequency keeps the minimum setting frequency unchanged. Conversely, when the PWM value is changed from 0% PWM to 100% PWM, the steps of the whole process described above will be reversed.

Specifically, when the power supply operates in the PWM combined with PWM frequency conversion dimming control module, and during the changing process of the PWM value from 100% PWM-0% PWM, the change of the PWM frequency can be set to any point according to the dimming effect.

The present invention has the following advantageous effects:

The present invention provides a method of freely switching the power supply dimming control method according to the load of the lamp condition. The implementation of this method can freely switch the dimming control method of the dimming power supply to DC voltage dimming, PWM dimming, PWM combined with PWM frequency conversion dimming, etc. The LED dimming power supply using this method combines the advantages of the above dimming control methods, significantly improves the compatibility with existing various types of lamps, and enables users to select a more appropriate dimming control method according to the load of the lamp of a practical application and its dimming characteristic, so as to achieve the optimal usage status and dimming effect of the lamp.

The embodiments in this specification are described in an incremental manner, each embodiment focuses on the differences with the other embodiments, and same or similar parts between the embodiments are provided for mutual reference.

While the principle and implementation method of the invention are described in some detail hereinbelow with reference to certain illustrated embodiments, it is to be understood that these embodiments are only intended for helping to understand the methodology of the present invention and its core ideas; there is no intent to limit the scope of the invention. To the contrary, it is intended to cover various modifications, alternatives and equivalents, and the scope of the appended claims therefore should be accorded the broadest interpretation so as to encompass all such modifications and similar arrangements and procedures. In summary, the contents of this document should not be construed as a limitation of the present invention.

What is claimed is:

1. A method for realizing a multiple dimming control mode of an LED power supply, applied to an LED power supply, the LED power supply comprising: a power supply main drive module, a power MOS tube, a DC dimming control module, a dimming signal collection module, a main control module and a mode switching module; the power supply main drive module being coupled to a lamp, the DC dimming control module, and the dimming signal collection module; the power MOS tube being installed on a connecting path of the power supply main drive module and the lamp; the main control module being coupled to the power MOS tube, the DC dimming control module, the dimming signal collection module and the mode switching module, characterized in that the method comprises the steps of:

detecting a status signal of the mode switching module by the main control module and determining a current dimming control method according to the status signal;

transmitting a dimming signal of the dimming signal collection module to the main control module, generating a corresponding dimming control signal based on the main control module according to the dimming signal, sending the corresponding dimming control signal to DC dimming control module, and controlling an output voltage of the power supply main drive module based on the DC dimming control module according to the dimming control signal to change a lamp brightness, if the dimming control method takes a DC dimming control mode;

using the main control module to output a maximum voltage control signal to the DC dimming control module, so that the power supply main drive module outputs a maximum voltage, and using the main control module to sample and analyze a signal size of the dimming signal collection module, and outputting a corresponding PWM drive signal to the power MOS tube to change the lamp brightness, if the dimming control method takes a PWM dimming control mode; and using the main control module to output the maximum voltage control signal to the DC dimming control module, so that the power supply main drive module outputs a maximum voltage, using the main control module to sample and analyze the signal size of the dimming signal collection module, and outputting a corresponding PWM combined with PWM frequency conversion drive signal to the power MOS tube to change the lamp brightness, if the dimming control method takes a PWM combined with PWM frequency conversion dimming control mode.

2. The method for realizing a multiple dimming control mode of an LED power supply according to claim 1, wherein when the dimming control method takes the PWM combined with PWM frequency conversion dimming control mode and the main control module outputs a PWM combined with PWM frequency conversion drive signal, and whenever the PWM combined with PWM frequency conversion drive signal is changed with one level every time, the frequency of the PWM signal will be synchronously changed with one level.

3. The method for realizing a multiple dimming control mode of an LED power supply according to claim 1, wherein when the dimming control method takes the PWM combined with PWM frequency conversion dimming control mode and during the changing process of the PWM value from 100% PWM to 0% PWM, and the PWM value is changed to N % PWM, the PWM frequency remains unchanged; during the changing process of the PWM value from N % PWM-10% PWM, the PWM value and the PWM frequency are synchronously changed; when the PWM value reaches 10% PWM, the PWM frequency reaches the minimum setting frequency, and when the PWM value changes from 10% PWM to 0% PWM, the PWM frequency keeps the minimum setting frequency unchanged; wherein N is the default PWM threshold, and N≥10%.

4. The method for realizing a multiple dimming control mode of an LED power supply according to claim 1, wherein when the dimming control method takes the PWM combined with PWM frequency conversion dimming control mode and during the changing process of the PWM value from 100% PWM to 0% PWM, the change of the PWM frequency can be set to any point according to the dimming effect.

* * * * *